United States Patent [19]

Peck

[11] Patent Number: 4,948,441
[45] Date of Patent: Aug. 14, 1990

[54] METHOD AND APPARATUS FOR FABRICATION OF AN OPENABLE CONTAINER LID

[75] Inventor: Norman E. Peck, Houston, Tex.

[73] Assignee: Rampart Packaging Inc., Williamsburg, Va.

[21] Appl. No.: 232,067

[22] Filed: Aug. 15, 1988

[51] Int. Cl.⁵ .............................................. B32B 31/20
[52] U.S. Cl. ...................................... 156/69; 156/293; 156/309.6; 156/312; 156/581; 156/583.1; 206/620; 206/634; 215/253; 220/266; 220/270; 220/276; 428/43
[58] Field of Search ................. 156/69, 293, 309.6, 156/312, 581, 583.1; 206/620, 634; 215/250, 253; 220/266, 270, 276; 428/43

[56] References Cited

U.S. PATENT DOCUMENTS

| | | | |
|---|---|---|---|
| 3,937,349 | 2/1976 | Hsu | 215/254 |
| 3,985,255 | 10/1976 | Blair | 215/254 |
| 4,018,353 | 4/1977 | Marklein | 215/253 |
| 4,284,199 | 8/1981 | Bigarella | 215/32 |
| 4,332,332 | 6/1982 | Ingemann | 220/276 |
| 4,333,585 | 6/1982 | Del Bon | 220/276 X |
| 4,344,472 | 8/1982 | Larkin et al. | |
| 4,361,250 | 11/1982 | Foster | 220/266 |
| 4,553,683 | 11/1985 | Paradis | 220/266 |
| 4,586,625 | 5/1986 | Garrett | 220/266 |
| 4,611,725 | 9/1986 | Kacalieff | 220/253 |
| 4,640,427 | 2/1987 | Marino et al. | 215/232 |
| 4,719,069 | 1/1988 | Reymann et al. | 264/296 |
| 4,722,449 | 2/1988 | Dubach | 215/235 |

FOREIGN PATENT DOCUMENTS 1241425 8/1971 United Kingdom .

Primary Examiner—Robert A. Dawson

[57] ABSTRACT

A method and apparatus are disclosed for the fabrication of an openable container lid wherein a failure zone opening is defined about the desired location of a future opening in the lid, and simultaneously with this operation the lid is joined to the flange of the container. The combination of both of these steps at a single work station minimizes the equipment necessary to attach a lid to a container.

5 Claims, 2 Drawing Sheets

FIG.5
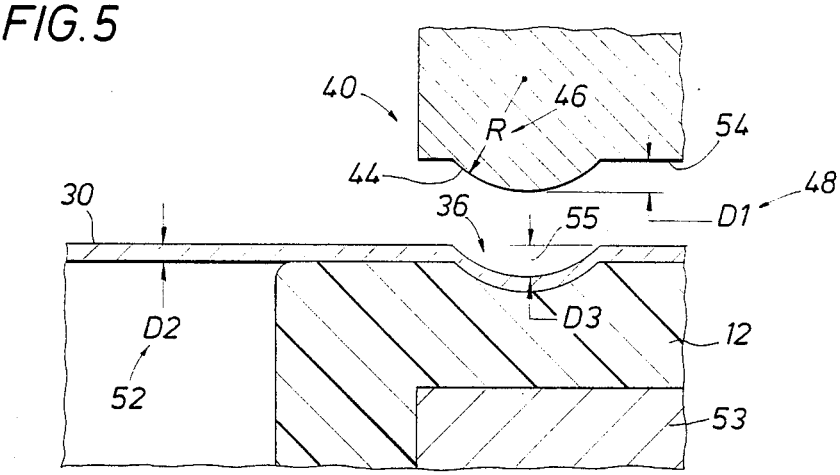
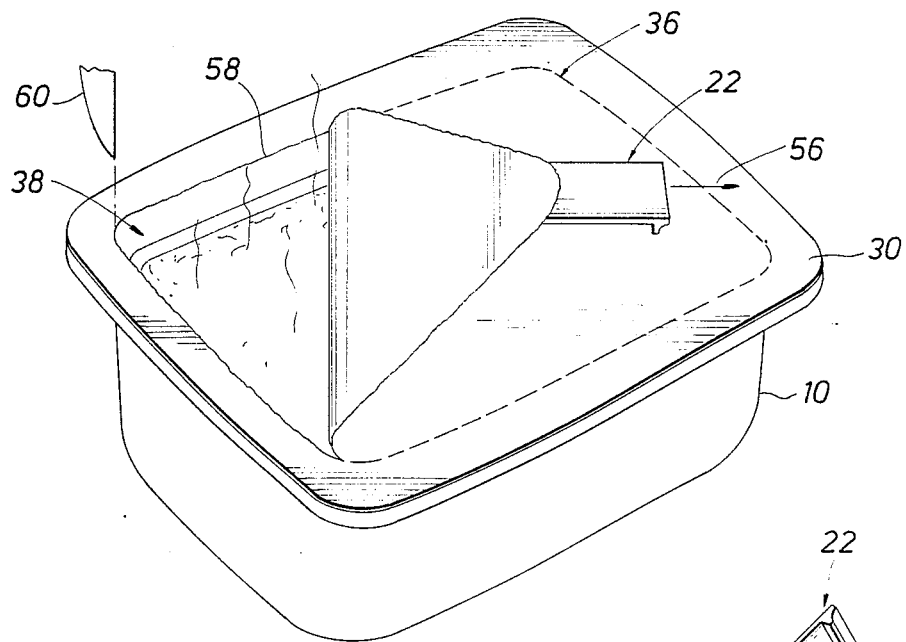
FIG.6
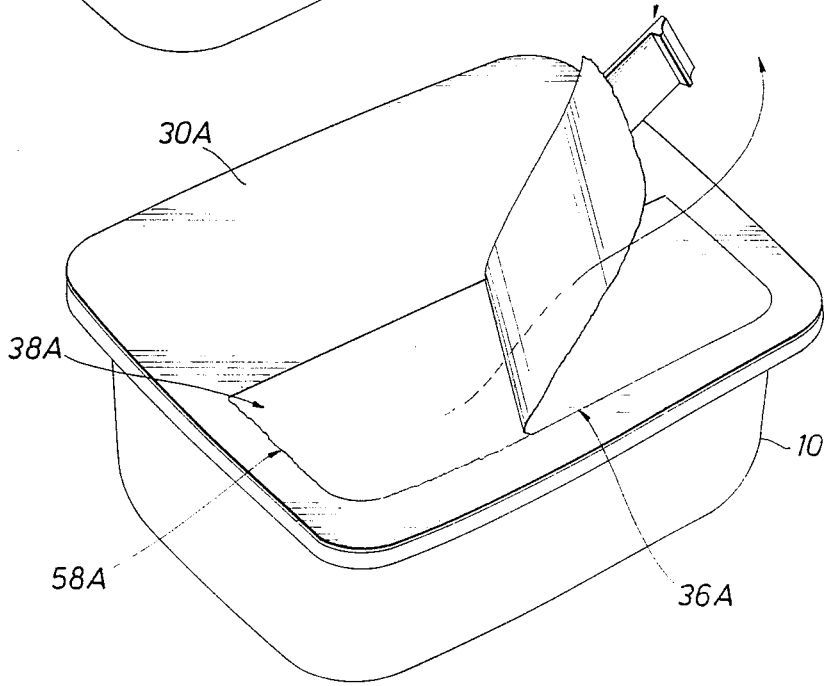
FIG.7

METHOD AND APPARATUS FOR FABRICATION OF AN OPENABLE CONTAINER LID

RELATED APPLICATION

This application is related to application Ser. No. 136,624 entitled "Thermal Lid Sealing Method and Apparatus" by John S. Thomas, Jr., filed Dec. 22, 1987, Group Art Unit 137.

FIELD OF THE INVENTION

This invention relates to a method and apparatus for fabricating an openable container lid, wherein the lid comprises the openable portion of lid stock that has been sealed to the flange of a container formed about the container opening. More specifically, the invention describes the formation of weakened areas in the lid stock material placed over the container opening, immediately prior to the thermal bonding of the lid stock material to the flange. In this manner, the location of future openings in the lid stock are defined and the lid stock is bonded to the container in one single downward thrust of a properly shaped heated die.

The invention therefore minimizes the fabrication time required to attach an openable lid to the container.

BACKGROUND OF THE INVENTION

The use of plastic containers for packaging food and other items has become more prevalent since new advances in this field have allowed the production of better containers. Such containers typically consist of the product carrying portion and a lid preferably sealable to the container to preserve the freshness of the contents. When it is desired to consume the contents, the problem arises of how to easily open the container with a minimum of effort. For this reason, the lid systems used to cover the container opening usually consist of a peelable or breakable material that may be punctured or torn, or in the case, for example, of beverage cans a frangible groove section may be imprinted in the container top lid which defines a preferential zone of failure of the lid material when subjected to the opening efforts of the consumer. This system embodies, for example, the popular "zip top" opening systems typically used on beverage containers.

In review of the prior art in this area, it becomes apparent that these frangible areas are typically defined by the stamping of a groove or other indentation into the material of the lid stock, in a separate operation, prior to the attachment of the lid stock to the container. For example, in U.S. Pat. No. 3,937,349 a frangible tear area is formed before the cap is placed on the bottle 30. In U.S. Pat. No. 4,332,332 the frangible area is formed in the lid stock and then in a separate operation the lid stock is heat sealed to the container. In U.S. Pat. No. 4,640,427 the frangible tear is formed with closure 11, but closure 11 is not bonded to the container at the same time but uses threads to become attached to the container 10. In U.S. Pat. No. 4,344,472 a frangible seal is formed and then closure 10 seals the opening in port flange 30. In U.S. Pat. No. 4,284,199 a frangible area is defined at the time the entire container is formed and no cap is thereafter placed on a pre-existing container and sealed thereto. In U.S. Pat. No. 3,985,255 the frangible area is defined on the lid in a separate operation prior to placement of the lid on the container. In U.S. Pat. No. 4,586,625 the frangible area is formed before the lid is placed on the container. In U.S. Pat. No. 4,553,683 the frangible area is formed on the housing prior to placing the housing on the cup 11 and bonding it thereto. In U.S. Pat. No. 4,611,725 l a frangible area is formed on the lid prior to placement of the lid on the container. In U.S. Pat. No. 4,361,250 a frangible area on the lid is formed prior to placement of the lid on the container. The same comment also applies to U.S. Pat. Nos. 4,722,449 and 4,018,353.

Great Britain Patent 1,241,425 teaches the sealing of the lid to the container by use of a heated die but does not mention the formation of a frangible area in the lid stock. And finally, a sales brochure by Indemitsu Petrochemical Company, Ltd. discloses their Magictop TM plastic container wherein a frangible area is formed in the container proper, and thereafter the container is sealed with a cover not having a frangible area.

In review of the above publication and patents the complexity of fabricating an openable lid and sealing the openable lid to a container becomes apparent. A method and apparatus need be developed that simplifies the manufacturing process necessary to yield an openable container.

SUMMARY OF THE INVENTION

In a preferred embodiment of the present invention lid stock comprising a thermoplastic material is placed on the flange formed about the opening of the container, and a heated die is used to melt a failure zone opening about the desired location of the future opening in the lid. While the lid stock remains on top of the container, the heated die thereafter joins the lid stock to the container flange to form the openable lid on the container opening.

In this manner the location of the future opening in the lid is defined almost simultaneously with the process necessary to attach the lid stock to the container. The efficiency of combining these steps reduces the capital requirements usually associated with having two sets of machinery to perform each operation separately, in addition to the manual and/or automatic handling equipment needed to transport the lid stock between the equipment as taught in the prior art.

It is therefore an object of the present invention to provide a method and apparatus for the economic manufacture of an openable container lid.

It is a feature of the present invention to form both the failure zone opening and a welded area between the lid stock and the container flange as the lid stock remains supported by the container flange.

These and other features, objects and advantages of the present invention will become apparent from the following detailed description wherein references made to the figures in the accompanying drawings.

IN THE DRAWINGS

FIG. 5 shows a schematic representation in cross section expanded from FIG. 4 showing the relative location and depth of the failure zone opening in the lid.

FIG. 6 shows a pictorial representation showing the lid opening formed by pulling the lid opening means.

FIG. 7 shows a pictorial representation of an alternative embodiment wherein the lid opening means and the failure zone openings are positioned to define a lid opening affecting one half of the lid surface.

DETAILED DESCRIPTION OF THE INVENTION

Figure 1:
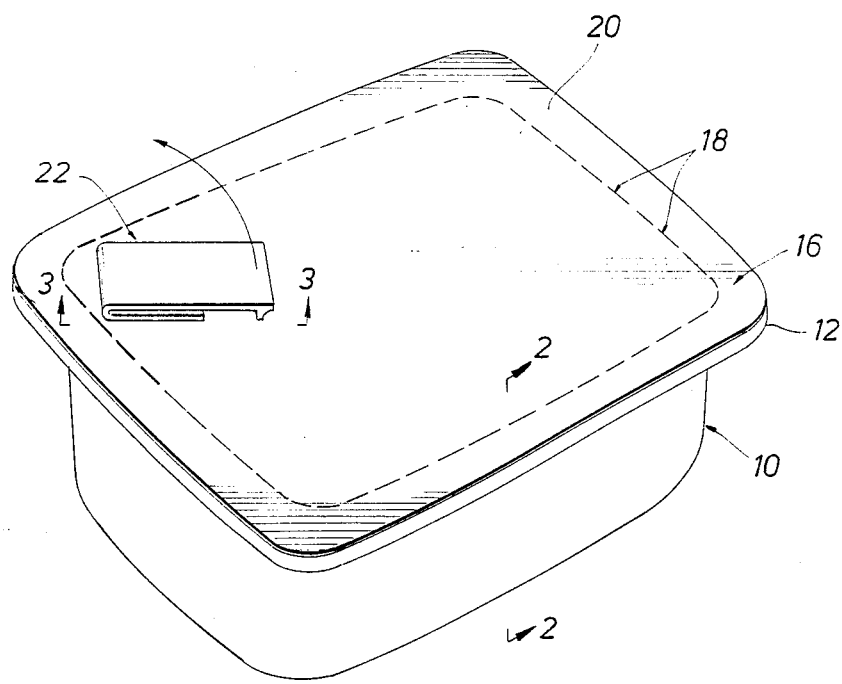
FIG. 1 is a pictorial representation showing lid stock supported by the container flange.
Figure 2:
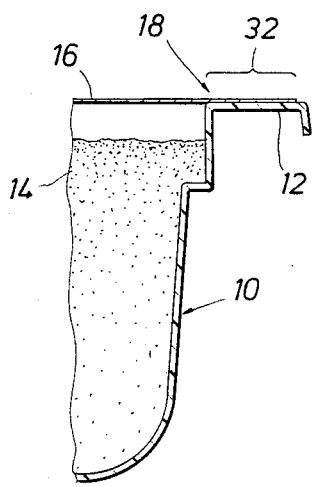
FIG. 2 shows a schematic representation in partial cross section taken along lines 2—2 of FIG. 1 of the lid stock resting upon the container.

Referring now to FIGS. 1 and 2, a container 10 having a flange 12 is shown containing a food such as soup 14. Lid stock 16 comprising in a preferred embodiment Ludlow PET/SARAN/PP material having a thickness of from 5 to 6 mils is shown positioned on and carried by the container flange 12. It is well recognized that many other lid stock materials may be used to close the container. The preferred location of a failure zone opening area 18 is shown pictorially by dotted lines on the lid stock upper surface 20. In other words, the dotted lines show the location where the failure zone opening area will be eventually formed.

Lid opening means 22 are shown attached to the upper surface 20 of the lid stock 16.

Figure 3:
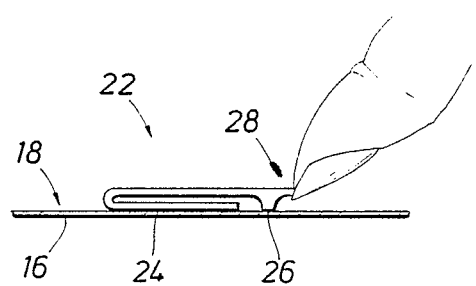
FIG. 3 shows a schematic representation in partial cross section taken along lines 3—3 of FIG. 1 of the lid opening means fastened to the lid stock.
Figure 4:
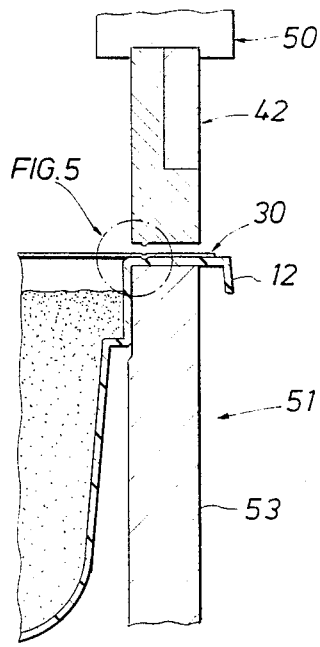
FIG. 4 shows a schematic representation in partial cross section showing the heater means withdrawing from contact with the lid.

Referring now to FIG. 3, the lid opening means 22 in a preferred embodiment are positioned adjacent the failure zone opening area 18 in a permanent manner by the use of glue 24 also used on the under surface of tack fastener 26. Upward force applied beneath nail catch 28 breaks tack fastener 26 and provides a grippable member preferably used to tear open the lid 30 (FIG. 4). A portion of the lid 30 around the container flange 12 is secured to flange 12 by the melting together at weld area 32 (FIG. 2) of the lid stock with the container flange.

Referring now to FIGS. 4 and 5 an apparatus 34 used for fabrication of the openable container lid 30 is shown. Means for placing the lid stock 16 on the flange of the container, such as by manual means or by use of automatic feed and positioning equipment well known to the art, have previously been used to align the lid stock properly on the top of the container flange.

Means for defining the failure zone opening 36 about the desired location for the future opening 38 (FIG. 6), in a preferred embodiment, comprise opening definition means 40 having the desired shape of failure zone opening 36, along with means for heating the opening definition means to a temperature sufficient to melt the thermoplastic material of the lid stock (such as heater means 42), along with means 50 for moving the opening definition means downward into contact with the lid stock so as to melt the failure zone opening into the lid stock, and support means 51 such as support 53 to provide a backing for the container flange 12 and lid 30.

The opening definition means 40 in a preferred embodiment comprise a radiused shoulder 44 having a particular radius R 46 of 0.025 inches and a shoulder offset dimension D1 48 of 0.010 inches. It should be well recognized that other radius R 46 and D1 48 dimensions may be used to accomplish the same mechanical result of imprinting failure zone opening 36 into the lid 30. Movement means 50 for moving the opening definition means 40 downward into contact with the lid stock may comprise a pneumatically-operated press system well known to the art.

In a preferred embodiment, the failure zone opening depth D3 55 is greater than 1.2 times the thickness D2 52 of the lid stock.

It should be well recognized that many other shapes may be used for the opening definition means 40 to accomplish the same mechanical result of defining a failure zone opening 36 about the lid stock upper surface 20. In a preferred embodiment, the lid stock material was sealed to 0.040 inch polypropylene which formed the container flange, by contacting the bottom surface 54 of the opening definition means with the weld area 32 (FIG. 2) located above the container flange 12. In other words joining the lid stock 16 to the container flange to form a lid for the container requires contacting the heated bottom surface to the weld area.

With the material used, the failure zone opening was defined and the lid was formed on the container flange in a seal time of 0.5 seconds. The temperature of the opening definition means was approximately 425° F.

In operation the openable container lid may be fabricated by first placing lid stock upon the container flange, thereafter defining a failure zone opening about the desired location of a future opening in the lid stock, and thereafter joining the lid stock to the container flange to form said lid on the container. The step of defining a failure zone opening is done by heating an opening definition means with thermal energy supplied from the heater means 42, moving the opening definition means downward into contact with the lid stock, and thereafter melting the failure zone opening into the lid stock.

Referring now to FIGS. 6 and 7 it can be seen that the lid opening means 22 moved in the direction indicated by arrow 56 have caused the lid material to fail at the location of the failure zone opening, thereby leaving a torn edge 58 about the opening 38. A knife 60 may be used to assist in the tearing process of the lid from the container 10.

In an alternative embodiment shown in FIG. 7, lid 30A may be designed such that the failure zone opening 36A is defined about half the area of the lid such that the lid opening only occupies a portion of the lid surface, thereby minimizing the extent of the torn edge 58A. As before lid opening means 22 are used to manually tear the lid portion from the top of the container 10.

Many other variations and modifications may be made in the apparatus and techniques hereinbefore described by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. A method of joining thermoplastic lid stock placed upon a thermoplastic container flange to said flange in a reopenable manner, said method comprising the following steps of:

heating opening definition means with thermal energy supplied from heater means, moving the heated opening definition means downward into contact with the lid stock causing a failure zone opening to be melted into the lid stock, and maintaining the opening definition means in contact with the lid stock until the lid stock is heat-sealed to the container flange.

2. The method of claim 1 wherein the step of maintaining the opening definition means in contact with the lid stock until the lid stock is heat-sealed to the container flange is done by contacting a heated bottom surface of said opening definition means to a portion of said lid stock located above said container flange.

3. An apparatus for fabricating an openable thermoplastic container lid, the container having a flange at the open end thereof and lid stock placed thereupon, said apparatus comprising:
opening definition means for defining a failure zone opening about the desired location of an opening in the lid stock and for concurrently melting a portion of the lid stock to the container flange.

4. An apparatus for fabricating an openable thermoplastic container lid, the container having a flange at the open end thereof and lid stock placed thereon, said apparatus comprising:
opening definition means having:
a shoulder defined at the lower end thereof, said shoulder shaped to melt a failure zone opening into a portion of said lid stock, and
a bottom surface adjacent said shoulder contoured to contact a portion of said lid stock located over said container flange,
means for heating the opening definition means to a temperature sufficient to melt the thermoplastic material of the lid stock, and
means for moving the shoulder and the bottom surface of the opening definition means downward into contact with the lid stock a sufficient distance to form said failure zone opening and concurrently heat-seal said lid stock to a portion of said container flange.

5. An apparatus for fabricating an openable thermoplastic container lid, the container having a flange at the open end thereof and a lid stock of a selected thickness placed thereon, said apparatus comprising:
opening definition means having;
a radiused shoulder formed at the lower end thereon, said shoulder shaped to melt a failure zone opening into a portion of said lid stock and having a shoulder offset dimension at least equal to the selected thickness of said lid stock, and
a bottom surface adjacent at least one side of said radiused shoulder contoured to contact a portion of said lid stock located over said container flange,
means for heating the opening definition means to a temperature sufficient to melt the thermoplastic material of the lid stock, and
means for moving the radiused shoulder and the bottom surface of the opening definition means downward into contact with the lid stock a sufficient distance to form said failure zone opening and concurrently heat-seal said lid stock to a portion of said container flange.

* * * * *